Patented July 6, 1937

2,086,093

UNITED STATES PATENT OFFICE 2,086,093

PROCESS FOR POLYMERIZING ACRYLIC ESTERS AND MIXTURES OF ACRYLIC ESTERS WITH VINYL ESTERS

Hermann Plauson, Darmstadt, Germany, assignor, by mesne assignments, to Röhm & Haas Company, Philadelphia, Pa., a corporation of Delaware No Drawing. Application January 30, 1931, Serial No. 512,494. In Germany February 1, 1930

16 Claims. (Cl. 260—2)

The invention relates to the polymerization of compounds of acrylic acid per se and to the polymerization of mixtures of such compounds with one another and with vinyl compounds.

The polymerization of compounds of acrylic acid by direct heating or in the presence of catalysts requires great care; in particular it is very difficult to keep the polymerization stage constantly at the same level, since the action of the temperature on the polymerization is very difficult to regulate.

According to the present invention, a process is provided by means of which an exact and easy control of polymerization of any degree is made possible. The process consists of emulsifying the compounds of acrylic acid or mixtures of these substances with vinyl compounds, first by the use of dispersion agents and dispersion accelerators, whereupon they are subjected to a polymerization in vessels with the addition of heat.

It is thereby possible to add various substances to the compounds of acrylic acid or mixtures of such compounds with vinyl compounds during the course of polymerization, by means of which substances the polymerization of the compounds of acrylic acid or mixtures thereof with vinyl compounds is changed in different ways and special characteristics are imparted to the products of the polymerization.

As applied to acrylic acid esters, the process is illustrated in detail by the following examples:

Example 1

500 grams of an acrylic acid ester, for instance, acrylic methyl ester, are emulsified with 200 to 500 grams of water with the addition of one of the well known emulsifying agents, for example, a sulphonated castor oil or its soaps, in known apparatus. The emulsion obtained in this way is put into a closed receptacle of 2 liter content with the addition of about 1% of an organic or inorganic superoxide, and is then heated. The polymerization heat liberated during the polymerization is absorbed by vaporization of the water and ester or regulated by supplying the required amount of cold water.

It is thereby possible to attain any desired degree of polymerization in a very simple way. When this degree of polymerization has been reached, the supply of heat and of cold liquid can be stopped.

Example 2

Instead of water, other non-solvents such as the saturated hydrocarbons, benzine, saturated heavy benzine and other petroleum fractions can be used as emulsifying media. Moreover, there may be used as emulsion accelerators the well known naphthene sulphonic acids, (produced in the refining of mineral oils) or their soaps, and finally, use can be made of a monoester of the glycols, amino compounds of the polyglycols, as other well known substances causing emulsion, which themselves act only slightly or not at all on the products of polymerization. The polymerization and regulation of the degree of polymerization is accomplished as in Example 1.

As polymerization accelerators, use can also be made of gaseous or vaporous substances besides superoxides, for instance, air, oxygen, nitrogen oxide.

By treatment of the acrylic acid compounds with gaseous polymerization accelerators, it is possible to improve the products of the polymerization in respect to strength and elasticity. Additions of aldehydes, organic peroxides, etc., are permissible and expedite the polymerization.

When the desired degree of polymerization is attained, the emulsion agent and the added substances can be removed by leaching or distilling.

By this process it is possible not only to polymerize compounds of acrylic acid as described alone, but also with other substances capable of polymerization, for instance, vinyl compounds, and to produce new products that have the good characteristics of both substances. By the polymerization of such substances in the emulsion form, an exceptionally homogeneous and fine-molecular distribution of the different constituents is obtained.

Example 3

1 molecular weight of acrylic acid ester and 1 molecular weight vinyl acetate are emulsified as in Example 1, and heated in a receptacle with the addition of air or oxygen as polymerization accelerator. After attaining the desired degree of polymerization, the heat effect can be regulated or interrupted by the supplying of cooling agents as they are used in the addition. After the dispersion agent is leached out, a polymerization product is obtained which consists of a mixture of acrylic acid methyl ester and polyvinyl-ester polymerizes, and combines the advantageous characteristics of the two products.

The proportions may be varied. Instead of vinyl acetate, use can be made of other vinyl compounds.

There have been set forth above specific examples relating to the polymerization of compounds of acrylic acid as described or mixtures of these substances, in which, by the use of dispersion media and dispersion accelerators, these substances are dispersed and subsequently polymerized in appropriate manner.

According to the present invention, it is now, however, possible by a practical method to so conduct the polymerization that the heat produced by the reaction is not liberated momentarily or suddenly, but gradually, and each step of the polymerization can be controlled even when the operation is conducted with large quantities of the reacting substances.

Radiation with ultra-violet light for the purpose of accelerating the polymerization and improving the polymerizate can be used and is included in the scope of the invention.

The process has been described with particular reference to compounds of acrylic acid as described, but obviously in its broader aspects the process is also applicable to the polymerization of other esters having characteristics similar to those of the compounds specifically enumerated.

What I claim is:

1. A process for polymerizing esters of acrylic acid which comprises emulsifying the esters and heating them to the reaction temperature.

2. A process for polymerizing esters of acrylic acid which comprises emulsifying the esters and heating them to the reaction temperature, the temperature being controlled throughout the reaction.

3. A process for polymerizing esters of acrylic acid which comprises emulsifying the esters, heating the emulsion to the polymerization temperature, and controlling the polymerization temperature throughout the reaction by the addition of a further quantity of the emulsifying medium.

4. A process as set forth in claim 3, in which peroxides are used as polymerization accelerators.

5. A process as set forth in claim 3, wherein an ester of acrylic acid and a vinyl ester are polymerized together.

6. A process as set forth in claim 1, wherein stirring takes place during the reaction.

7. A process for polymerizing esters of acrylic acid, which comprises emulsifying such esters with emulsifying agents, heating to the reaction temperature while avoiding overheating by the continuous addition of further quantities of the emulsifying medium.

8. A process for the polymerization of esters of acrylic acid, which comprises emulsifying the esters with dispersion agents, then heating the said esters to the reaction temperature, and preventing over-heating.

9. A process for the polymerization of esters of acrylic acid, which comprises emulsifying the esters with dispersion agents, then heating the said esters to the reaction temperature, and preventing a rise of temperature substantially above 100° C.

10. A process which comprises emulsifying an ester of acrylic acid and then polymerizing said ester.

11. A process for polymerizing the methyl ester of acrylic acid, which comprises emulsifying said ester and heating it to the reaction temperature.

12. A process for jointly polymerizing esters of acrylic acid and vinyl esters, which comprises emulsifying mixtures of said esters and heating them to the reaction temperature.

13. A process for jointly polymerizing mixtures of an ester or acrylic acid and vinyl acetate, which comprises emulsifying a mixture of said esters and heating said emulsified mixture to the reaction temperature.

14. A process for polymerizing esters of acrylic acid, which comprises preparing an aqueous emulsion of the esters with the aid of an emulsifying agent and heating said emulsion to the reaction temperature.

15. A process for polymerizig esters of acrylic acid, which comprises emulsifying the esters and heating them to the reaction temperature in the presence of an oxygen yielding substance as a polymerization accelerator.

16. A process for polymerizing esters of acrylic acid, which comprises emulsifying the esters and heating them to the reaction temperature in the presence of a peroxide as a polymerization accelerator.

HERMANN PLAUSON.